July 14, 1931.  O. A. STROMER  1,814,976
LEVELING DEVICE
Filed Nov. 9, 1927
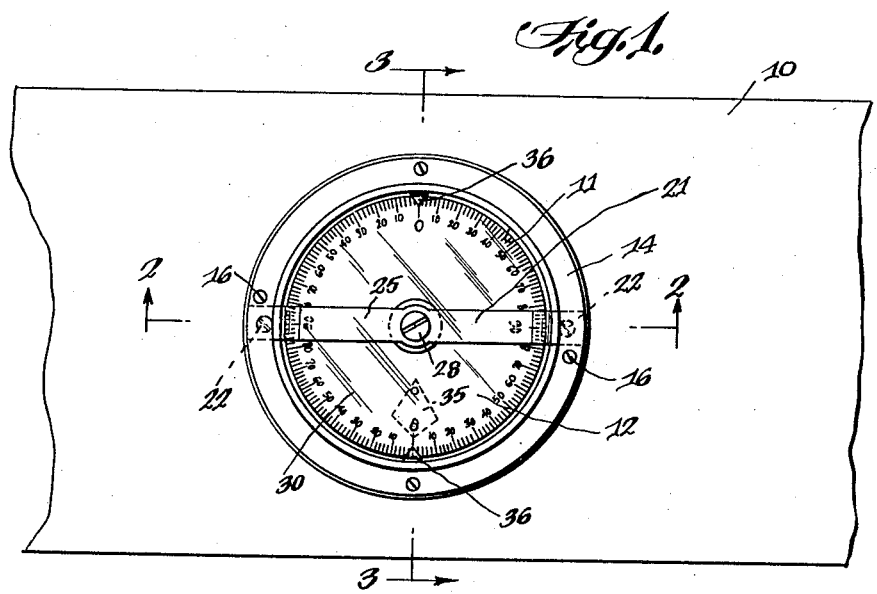
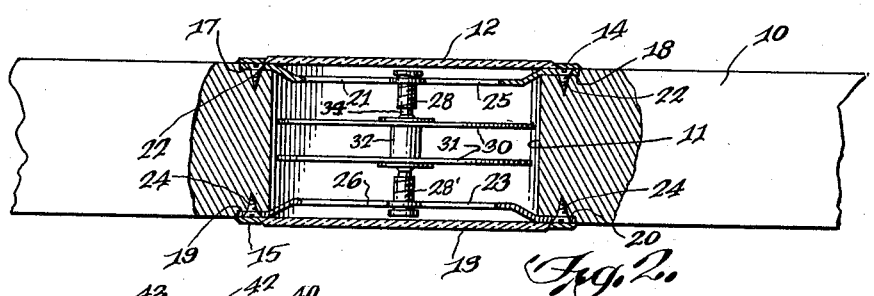
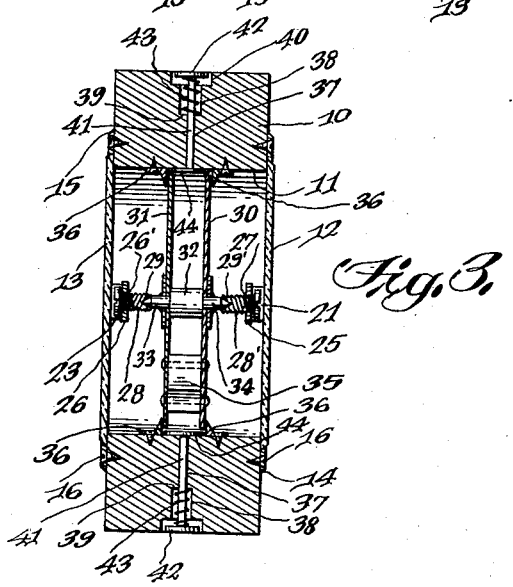
Oscar A. Stromer
INVENTOR
BY Victor J. Evans
ATTORNEY Patented July 14, 1931

1,814,976

UNITED STATES PATENT OFFICE

OSCAR A. STROMER, OF SHEBOYGAN, WISCONSIN

LEVELING DEVICE

Application filed November 9, 1927. Serial No. 232,097.

This invention relates to certain novel improvements in leveling devices such as are employed by carpenters, bricklayers and other similar artisans.

The salient object of my invention is to provide a level of the foregoing character which will be arranged such that the likelihood of injury by rough handling will be alleviated.

Another object of the invention is to provide a rotatable member in a level which will be weighted in order to maintain it in a variable relation with the horizontal.

A further object of the invention is to provide a level of the foregoing character in which the angle of inclination may be read in degrees.

A still further object of the invention is to provide a level which will be simple and economical in construction and efficient in use.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a fragmentary side elevational view of a level embodying a preferred form of construction for my invention;

Fig. 2 is a sectional view taken substantially on the plane of the line 2—2 of Fig. 1;

Fig. 3 is a sectional detailed view taken substantially on the plane of the line 3—3 on Fig. 1;

Referring to the drawings wherein the preferred embodiment of my invention is illustrated, it may be seen that a level frame 10 is provided which may be of any form such as is now employed in such devices. At substantially the center portion of the frame 10 an opening 11 is provided. Disposed on the side walls of the frame 10 over the opening 11 are glass crystals 12 and 13 which are removably held in position by rings 14 and 15 which are attached to the frame 10 in any approved manner as by the screws 16.

At diametrically opposed points about the opening 11 on the sides of the frame 10, recesses such as 17 and 18, and 19 and 20, are provided. A bar 21 is mounted in the recesses 17 and 18 and is secured in position in any approved manner as by the screws 22. A bar 23 is mounted in the recesses 19 and 20 and is suitably held in position as by the screws 24. The bars 21 and 23 include inwardly positioned off-set portions 25 to 26. At substantially the midpoint in the extent of the bars 21 and 23, screw threaded openings 26' and 27 are provided. Adjustably mounted in the openings 26' and 27 are the screws 28 and 28' which embody recesses 29 and 29' in their inner ends.

Two disks 30 and 31 are provided which are suitably mounted on a hub portion 32 which has pointed bearing rods 33 and 34 extending outwardly therefrom. The pointed ends of rods 33 and 34 are adapted to be mounted in the recesses 29 and 29' and thus the disks 30 and 31 are rotably supported. By properly positioning the screws 28 and 28' proper tension may be exerted on the bearings of these disks for the purpose of taking up wear and for purposes of adjustment.

As is shown best in Fig. 1 the faces of disks 30 and 31 are graduated in any approved manner contiguous the edges thereof. In the present instance two diametrically opposed zeros are provided and graduations are numbered outwardly from the zeros and in the present instance these numbers meet at a mark which corresponds to the midpoint between the zeros. These graduations are adapated to represent degrees in order that the angle of inclination of the level may be indicated. Mounted between the disks 30 and 31 in alignment with the zeros is a weight 35.

On the rings 14 and 15 indices 36 are provided. The indices 36 and the zeros heretofore mentioned are so positioned that when the frame 10 is horizontal the indices and the zeros will be in register. When the frame 10 is positioned at an angle the weight 35 will tend to hold the disks 30 and 31 in the same position and inasmuch as the indices 36 are carried by the frame 10, they will register with graduations on the disks 30 and 31 which correspond to the angle of inclination of the frame 10.

It is apparent when the frame 10 is moved to angular position the weight 35 will cause the disks 30 and 31 to swing with oscillatory or pendulum-like movement. In order to facilitate the securing of the reading I provide a braking device. An opening 37 extends from one of the side walls of the frame 10 into the opening 11. The portions of the opening 37 are enlarged as indicated at 38 to provide a shoulder 39. The outer portion of the opening 37 is enlarged as at 40. A stem 41 is mounted in the opening 37 and includes a head 42 which is mounted in the center opening 40. A spring 43 extends between the head 42 and the shoulder 39 and urges the stem 41 outwardly. The lower end of stem 41 embodies a head 44 which engages the wall of the opening 11 and limits the outward force of the spring so as to maintain the head 42 flush with the edge of the frame 10 or slightly therebelow. When the stem 41 is depressed the head 44 engages the peripheries of the disks 30 and 31 and thus these disks may be quickly brought to a fixed position. It is apparent that a similar braking device is provided on the opposite opening 11.

It is apparent from the foregoing description that I have provided a level which is simple and economical in construction and one in which the likelihood of injury due to rough handling, is alleviated. In addition to the foregoing the level embodies an arrangement whereby the angle of inclination of the level may be read in degrees.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variation and modifications as come within the scope of the appended claim.

Having thus described my invention, what I claim as new and desire to protect by Letters Patent is:

A level including a substantially rectangle frame having a transversally extending substantially circular opening provided therein, bearing bars fixed to said frame at opposite ends of said opening and adapted to extend diametrically thereacross, said bearing bars having inwardly disposed offset portions and having screw thread openings formed therein at substantially the midpoint in the extent thereof, screw members mounted in said screw threaded openings having sockets formed therein in the ends thereof directed toward each other, circular indicating means in said opening, trunnions on said indicating means adapted to be journaled in said sockets whereby to support said indicating means for rotative movement, weight means associated with said indicating means whereby to urge said indicating means into a predetermined position, and indices mounted in said opening in juxtaposition to said indicating means adapted to register therewith.

In testimony whereof I affix my signature.

OSCAR A. STROMER.